United States Patent
Chadowitz et al.

(10) Patent No.: US 10,313,310 B2
(45) Date of Patent: Jun. 4, 2019

(54) SECURE GASOLINE STORAGE TANK GAUGE MONITORING SYSTEM

(71) Applicants: Jack Chadowitz, New Bern, NC (US); Chaniel Chadowitz, Allston, MA (US)

(72) Inventors: Jack Chadowitz, New Bern, NC (US); Chaniel Chadowitz, Allston, MA (US)

( * ) Notice: Subject to any disclaimer, the term of this patent is extended or adjusted under 35 U.S.C. 154(b) by 425 days.

(21) Appl. No.: 15/151,714

(22) Filed: May 11, 2016

(65) Prior Publication Data

US 2016/0334259 A1   Nov. 17, 2016

Related U.S. Application Data

(60) Provisional application No. 62/159,440, filed on May 11, 2015.

(51) Int. Cl.
*H04L 29/06* (2006.01)
*G06F 21/44* (2013.01)

(52) U.S. Cl.
CPC .......... *H04L 63/0428* (2013.01); *G06F 21/44* (2013.01); *H04L 63/0876* (2013.01); *H04L 63/101* (2013.01)

(58) Field of Classification Search
CPC ............. H04L 63/0428; H04L 63/0876; H04L 63/101; G06F 21/44
See application file for complete search history.

(56) References Cited

U.S. PATENT DOCUMENTS

| | | | | |
|---|---|---|---|---|
| 6,442,448 B1* | 8/2002 | Finley | ..................... | B67D 7/145 700/231 |
| 6,760,410 B1* | 7/2004 | Lee | ........................ | G06F 3/0481 379/433.06 |
| 8,384,670 B1* | 2/2013 | Wright | ..................... | G06F 9/453 345/168 |
| 9,887,845 B2* | 2/2018 | Carapelli | .................. | H04L 9/32 |
| 2006/0169039 A1* | 8/2006 | Zalenski | ............. | G01F 23/2963 73/290 R |
| 2008/0126213 A1* | 5/2008 | Robertson | .............. | G06Q 20/20 705/21 |
| 2014/0150056 A1* | 5/2014 | Williams | ................ | G06F 21/36 726/2 |

OTHER PUBLICATIONS

"System Overview I My TankInfo" Web site page http://mytankinfo.com/solutions/ accessed on Oct. 10, 2018.
Easily Self-Installed Hardware for ATG Automated Data Entry http://mytankinfo.com/veeder-root-tls-350-atg-example-with-broadband-interface-hardware-b-comm/; accessedOct. 10, 2018.

* cited by examiner

*Primary Examiner* — Ayoub Alata (57) ABSTRACT

A gauge adapter system, comprising a gauge adapter device and a server, the gauge adapter device having a gauge interface circuit board comprising a network adapter, at least one set of pins adapted to connect to a tank gauge, a power interface connected to the gauge interface circuit board adapted to receive power from the tank gauge; and a plurality of lights adapted to provide transmit and receive indications, wherein each gauge adapter device has a unique source IP address, as well as a server comprising, a decryption and encryption module that encrypts and decrypts messages, a plurality of gauge adapter device queues each in communication with a gauge adapter device, the queues containing commands for the gauge adapter devices, and a command generator adapted to placing commands in the device queues.

14 Claims, 6 Drawing Sheets

5 — Device initiates communication without static IP address or port forwarding

10 — Private key is encoded to device hardware and location of device

15 — Communications between devices and router/server are encrypted and decrypted with private keys 20 — Queues are filled by the command generator tasks and gauge emulation tasks 25 — Command generators and gauge emulation tasks use command filtering to ensure only authorized commands placed in device's queue 30 — Command generator places commands in device queues 40 — Source IP address used to authenticate the connection 45 — Incoming port number used to identify specific gauge 50 — Gauge emulation task sends task from external computer to device queue

| 55 | Reply from gauge sent to external connected computer |
| 60 | User configures software on external computer with server IP address and port which corresponds to specific gauge |
| 65 | Connection enabled on server side using source IP address |
| 70 | Server uses access contol lists to authenticate external computers |
| 75 | Provides interface to view data and manage devices |
| 80 | Performs fuel level forecasting and business inventory reconciliation |

Fig. 4b

SECURE GASOLINE STORAGE TANK GAUGE MONITORING SYSTEM

CROSS-REFERENCE TO RELATED APPLICATION(S)

The present application claims priority to U.S. Provisional Patent Application No. 62/159,440 filed on May 11, 2015, entitled "The Kachoolie" the entire disclosure of which is incorporated by reference herein.

BACKGROUND OF THE INVENTION

1. Field of Invention

The present invention relates to the field of electronic monitoring of gasoline storage tank contents at a gas station.

2. Description of Related Art

Electronic tank gauges for fuel tanks at filling stations, such as those manufactured by VEEDER ROOT are typically monitored locally by viewing the display on the gauge, printing using a gauge mounted printer, or via a local computer connected to the gauge via a serial cable, or remotely using a remote computer via a telephone line and modem at both sides, or remotely using a remote computer via the Internet using a TCP/IP connection. In all cases where a computer is used, a polling type protocol is used to request information or make configurations changes. Polling is always initiated by the computer. Polling requires both a static IP address and, if the tank gauge is not directly connected to the Internet, as in most cases, routing of messages received at the static IP address to the tank gauge's internal IP address (port forwarding) must be performed by the location's router. Remote locations, such as gas stations and convenience stores, typically have simple residential-type Internet service often lacking a fixed or static IP address. In addition, the router is often poorly maintained and the required port forwarding configuration is often lost. Also, although the routers used with this type of Internet service can provide some security against cyber-attacks, configuring the security measures is complex and difficult to maintain. These routers are often replaced causing loss of configuration settings and these routers can be compromised. The electronic tank gauges, by virtue of having to be polled require an IP address, typically an internal IP address on the filling station's Local Area Network. The proprietary communications protocols developed and used by the tank gauge manufacturers were originally developed for serial communications over directly wired serial connections or via point to point telephone modem connections. As such these protocols provide minimal security because the optional password is limited to 6 characters, the password is visible as plain text and there is no timeout protection against computer based password cracking tools. The communications protocols' protection features are of little value in protecting against unauthorized access to the tank gauges when they are polled over the Internet. Tank gauges that are protected by routers and other security devices at the gauge's location may be attacked through the remote computers that are legitimately polling the tank gauges and who are authorized to pass through the routers and security devices. Viruses in these polling computers or even on computers on the same network as the polling computers, are undetectable unless active, have access to the lists of filling station static IP addresses, run on computers authorized to communicate with the tank gauges, and can send commands to the tank gauges while assuming the disguise of the actual polling software. A limited number of polling computers poll the majority of Internet connected gauges creating a small target for maximum damage. The polling computers cannot effect common protection such as encryption and selective command blocking due to the constraints of the communications protocols. The communications protocols, by their design, support both requests for information and commands to change settings in the tank gauge. A cyber-attack on an unprotected tank gauge or a virus on a polling computer can issue commands that can disable the gauge, cause incorrect readings in the tank gauge, create spurious alarms, disable critical alarms, delete tank gauge configuration, delete archive copies of configuration, change clock settings and more. Any command supported by the protocol can be issued. These commands can cause disruption to filling station business, cause EPA fines for incorrect release detection reporting, cause spills, cause maintenance costs and more. As commands are not logged in the tank gauges, a cyber-attack that makes changes, then reverses them at a later time may cause multiple expensive service calls because the problems come and go and are never resolved. Communication with the gauges over the Internet using polling over TCP/IP is expensive in terms of setup, equipment and especially maintaining the router configuration settings for port forwarding and security.

Devices are found in the art that relate to communications systems for storage tank monitors. Some prior art devices provide a retrofit filling station communication system that includes a remote communication adapter operatively connected to existing underground wiring, wherein the device is associated with POS functionality to monitor fuel levels. Other devices provide a high accuracy MEMS mass flow meter compatible with conventional variable area flow meters, wherein the device is equipped with a standard RS485 for remote management. These prior art systems and methods, however, fail to provide a secure, remote communication for gas stations by upgrading existing gauges that are able to monitor fuel supply, in real-time, to provide the most updated information from a variety of instruments.

Therefore, there exists a need for a system and method that provides a secure, remote communication means for filling stations for fuel tank gauges and other device monitoring and management.

SUMMARY OF THE INVENTION

A gauge adapter device has a gauge interface circuit board comprising a network adapter, at least one set of pins adapted to connect to a tank gauge, a power interface connected to the gauge interface circuit board adapted to connect to the tank gauge to receive power from the tank gauge, and a plurality of lights adapted to provide transmit and receive indications.

The device may be insertable into a tank gauge housing, and may have a bracket for mounting the device on a tank gauge housing. The bracket may be perforated. The gauge adapter circuit board has a reset button in an embodiment.

The gauge adapter device may have a power conditioning circuit between the power interface and the gauge interface circuit board, and a translucent housing, wherein the gauge adapter circuit board is mounted within the translucent housing.

A gauge adapter system has a gauge adapter device and a server, the gauge adapter device having a gauge interface circuit board comprising a network adapter, at least one set of pins adapted to connect to a tank gauge, a power interface connected to the gauge interface circuit board adapted to connect to the tank gauge to receive power from the tank gauge; and a plurality of lights adapted to provide transmit and receive indications, wherein each gauge adapter device communicates with a server comprising a decryption and encryption module that encrypts and decrypts messages a plurality of device queues each in communication with a gauge adapter device, the queues containing commands for the devices, and a command generator adapted to placing commands in the device queues.

The system may also have an external computer using a gauge emulation feature to send commands and receive responses through the system, wherein the commands are authenticated by a source IP address of the external computer, as well as an access control list of authorized IP addresses, wherein the server authenticates an external computer operating gauge emulation software by comparing the external computer source IP address to the access control list.

A method for monitoring a tank gauge has the steps of encrypting and decrypting communications between one or more gauge devices and server using private keys encoded to the hardware and location of the one or more gauge adapter devices, each gauge adapter device being associated with a command queue containing command generator tasks and tank gauge emulation tasks, using command filtering to ensure only authorized commands are placed in the associated gauge adapter device's queue., and performing fuel level forecasting and business inventory reconciliation.

The source IP address may be used to authenticate the connection from an external device, and the source IP and the incoming port number is used to identify a specific tank gauge. The method may also have tank gauge emulation, having the steps of an external computer sending a command to the gauge adapter device queue, and sending a reply from the gauge adapter device to the external computer, wherein the user configures the external computer with a server IP address and a port corresponding to a specific gauge adapter device.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Preferred embodiments of the present invention and their advantages may be understood by referring to FIGS. 1-4*b*, wherein like reference numerals refer to like elements.

The system comprises a server that manages a number of gauge adapter devices which interface with tank gauges to provide data to the server. The server connects with the gauge adapter devices, and manages the devices' security gauge emulation functionality, communication and remote monitoring/updates. The gauge adapter devices communicate with the server through the Internet connection at the filling station.

Figure 1:
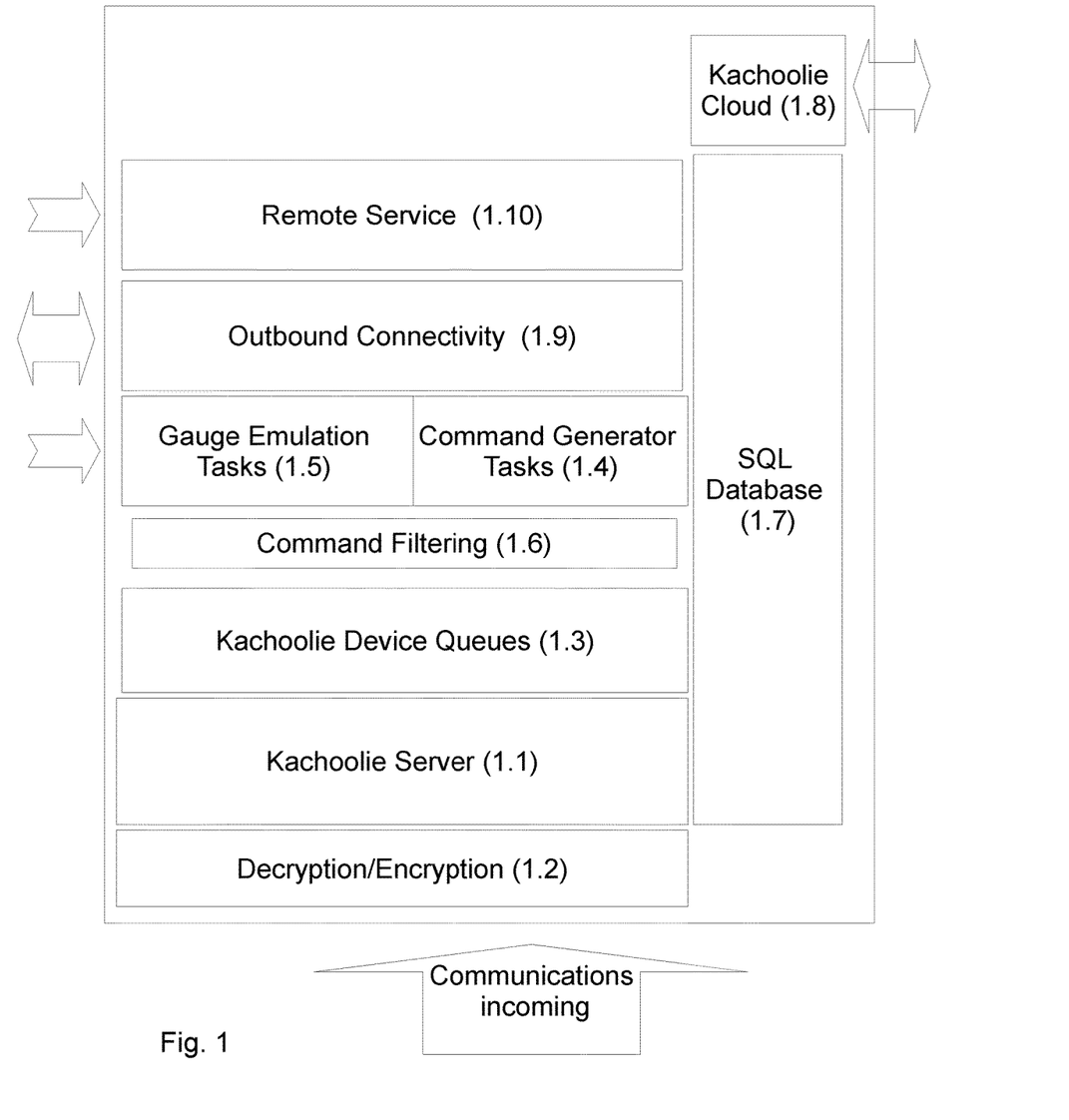
FIG. 1 shows a functional diagram of the server software of the present invention according to an embodiment of the present invention.
Figure 4A:
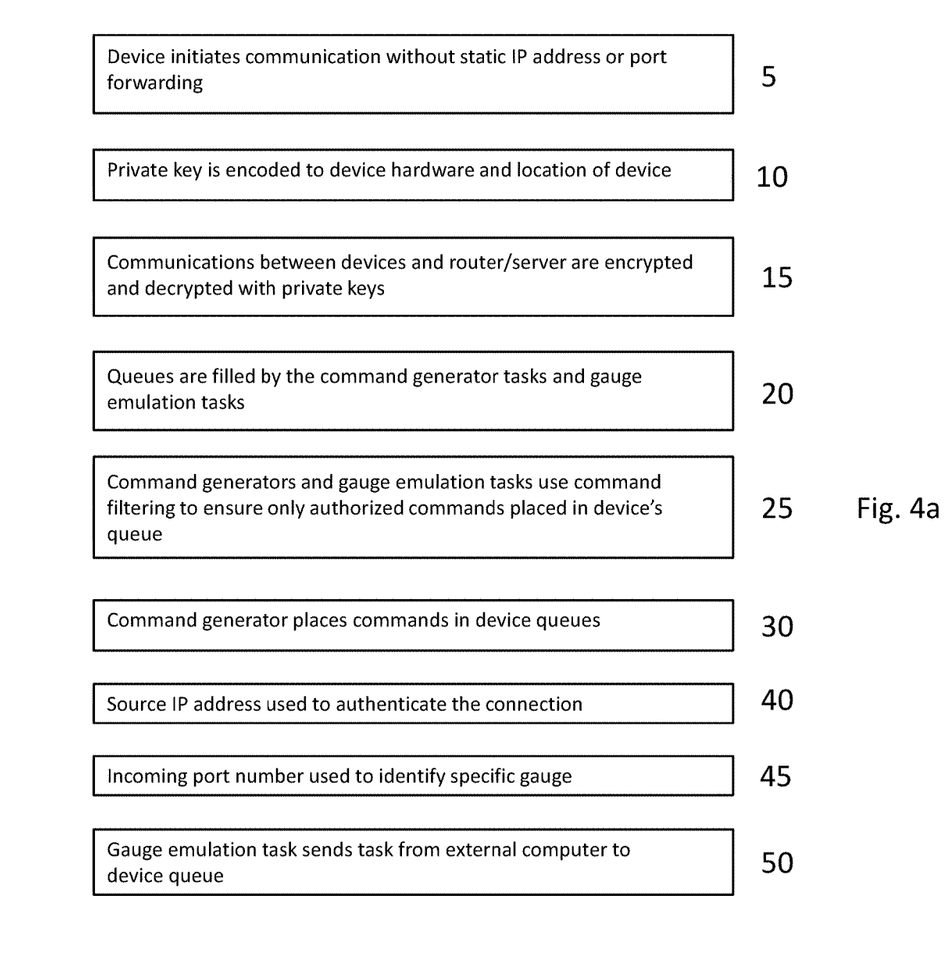
FIG. 4*a-b* are flowcharts showing a method of use of the gauge adapter device, according to an embodiment of the present invention.

Referring now to FIG. 1, a functional diagram of the server software is shown. The Server 1.1 uses a sophisticated event driven architecture that enables it to scale to thousands of concurrent connections from gauge adapter devices. This architecture provides fast response and continuous connections to field devices that is important for scalability, data updates every 30 seconds or less, and instantaneous sending of commands. The Server 1.1 enables communication from gauge adapter devices at locations where there is no static IP address and without port forwarding being required at the filling station router. In step 5 the gauge adapter device initiates the communications, a method whereby neither a static IP address nor port forwarding is required. The Server 1.1 is responsible for decoding messages from devices and placing them in the server SQL database 1.7 organized by unique device identifier.

The decryption/encryption module 1.2 uses SSL encryption with Public and Private RSA keys. The Public key is kept on the server, the Private key is stored in the gauge adapter device. In step 10 the Private key is encoded to the device hardware and the location of the gauge adapter device to protect against device theft and use at unauthorized locations. In step 15 all communications between the gauge adapter devices and server are encrypted and decrypted with these keys.

Gauge adapter device queues 1.3 are used to send commands to the gauge adapter devices. Each gauge adapter device has a dedicated queue. In step 20 the queues are filled by the command generator tasks 1.4 and the tank gauge emulation tasks 1.5 Command examples are: "get in binary format", "current inventory" (i20100), "get urgent alarms" (i11100), "get deliveries" (i20200). Gauge adapter device queues enable asynchronous operation, speed, security and flexibility. Both command generators and tank gauge emulation tasks use Command Filtering 1.6 in step 25 to ensure that only commands authorized for a particular device are placed in the gauge adapter device's queue.

The Command Generator tasks 1.4 place commands in the gauge adapter device queues 1.3 in step 30 based on the configuration setup which is individual per gauge adapter device. The setup includes the commands and the period at which they are placed in the individual gauge adapter device queues.

Figure 4B:
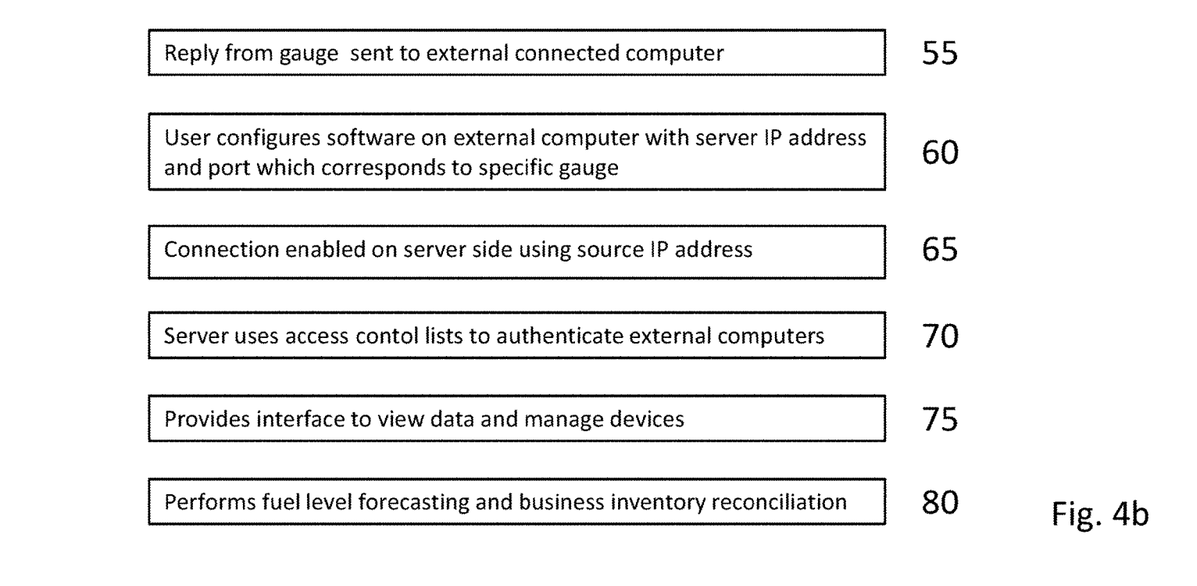

In step 35 the Gauge Emulation tasks 1.5 are created and added to a gauge adapter device's queue when connections are made from external computers that want to connect to a tank gauge using the gauge communication protocols. In step 40 the source IP address of external computer initiating the incoming connection (the connected computer) is used to authenticate the connection. In step 45 the incoming port number is used to identify the specific gauge. Password protection as provided by the communications protocol is supported and is optional. Once communication is established, in step 50 the tank gauge emulation task sends commands it receives from the external connected computer to the gauge adapter device queue via the command filtering 1.6 with filtering as specified for the gauge adapter device. The reply from the gauge adapter device is sent to the external connected computer in step 55. This tank gauge emulation feature enables any software that complies with the VEEDER ROOT communications protocols to send commands and receive responses through the system. In an embodiment, tank gauge emulation is achieved in the following manner: in step 60, on the user side a user configures his or her software on an external computer with the server IP address and the port which corresponds to the specific gauge adapter device. In step 65, on the server side the connection is enabled using the source IP address of the user software on the external computer, meaning the IP address from the external computer from which the user initiates the connection. In step 70 the server uses an Access Control List (ACL) of authorized IP addresses linked individually to the gauge adapter devices to authenticate the external devices.

Command Filtering 1.6 controls which commands can be sent to each tank gauge. This is an important part of the security that this invention provides, which, along with encrypted communications, ensures that attacks on the server network, the device network, or on Internet communications cannot send commands to the connected gauges. Filtering is configured on the server and is specific for each tank gauge.

The database is a SQL database. 1.7 It is used to store configuration data and responses from gauge adapter devices. It provides information to Cloud 1.8, a web server that provides a user interface for gauge adapter device data.

The Outbound Connectivity tasks 1.9 provide gauge adapter device data to other systems via file transfer and web services using non proprietary means. The data can be pulled or pushed.

The Remote Service tasks 1.10 can connect to individual gauge adapter devices for the purpose of fault finding, software updates and feature upgrades. All communication uses the encryption described above.

The Cloud 1.8 is a network-connected web server that provides an interface to view data and manage devices at step 75, and performs calculations and displays reports for fuel level forecasting, Business Inventory Reconciliation (BIR) and others, at step 80. The high frequency rate of inventory data and importing sales information made possible by the technology makes it possible for calculations such as BIR to be performed in the server rather than at the tank gauge. This makes it possible to provide services such as BIR for fueling sites which do not have tank gauges capable of performing these calculations and for tank gauges that are not connected to Point of Sales (POS) systems.

Figure 2:
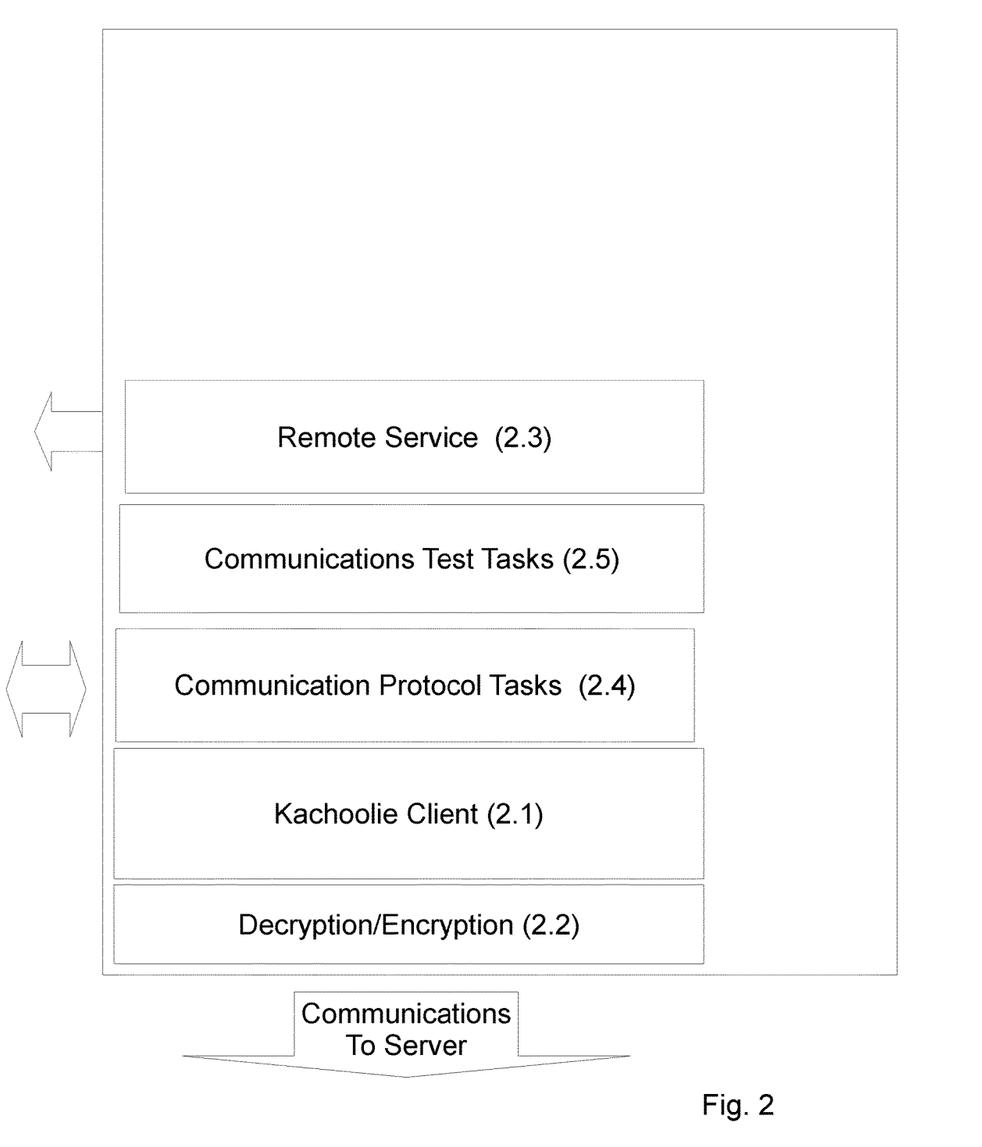
FIG. 2 shows a functional diagram of the device software of the present invention according to an embodiment of the present invention.

Referring now to FIG. 2, a functional diagram of the software or firmware running on the gauge adapter device's processor. The Client software 2.1 initiates and maintains communications via an encrypted point to point SSL Internet connection 2.2 with the server software 1.1. It uses the Private key which is itself encrypted and tied to a hardware identifier and the location where it is installed. The Remote Service task 2.3 maintains a connection with the Remote Service tasks 1.9.

The Communications Protocol tasks 2.4 are called by the Client based on a command identifier. The identifier determines which protocol and which physical connection will be used to communicate with the tank gauge, Point of Sale (POS) system or other systems connected to the gauge adapter device.

Communications test tasks 2.5 are used to troubleshoot problems with external devices. These tasks are accessed remotely via the remote service task 2.3 and provide a means of remote troubleshooting without visiting the fueling station.

Figure 3A:
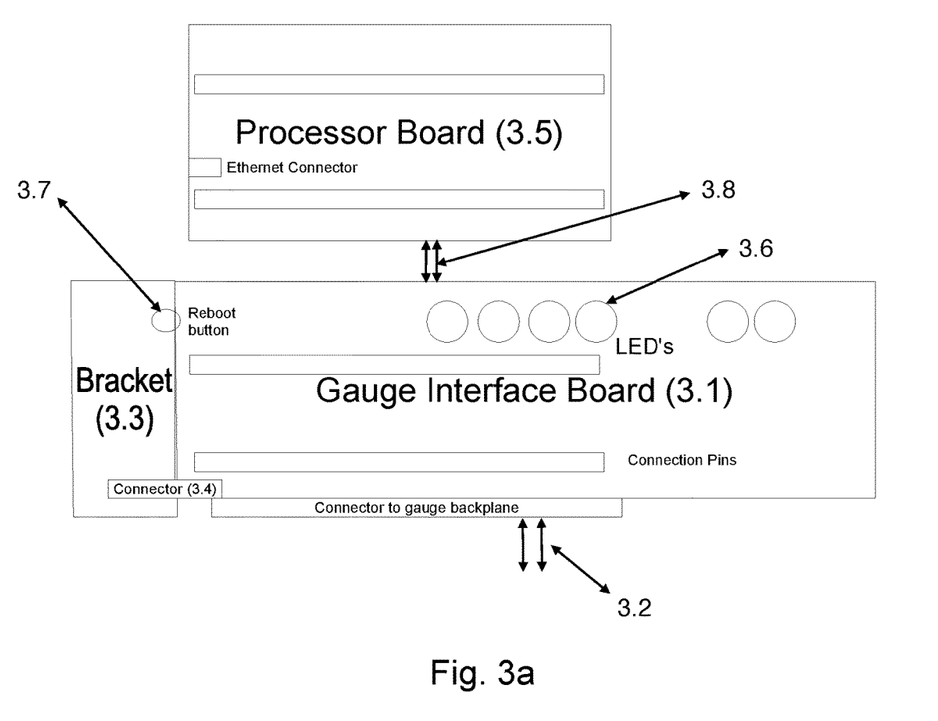
FIG. 3*a* is a schematic diagram view of the gauge adapter device, according to an embodiment of the present invention.

Referring now to FIG. 3a, a schematic of the gauge adapter device in a first embodiment of the Device is shown. The gauge interface circuit board 3.1 is designed with a form factor suitable for inserting into a VEEDER ROOT TLS 350 or TLS 300 tank gauge. The board is powered by the tank gauge through the power interface 3.2 eliminating the need for a power outlet in the proximity of the tank gauge. This is a significant advantage as the tank gauges often do not have an adjacent outlet and the cost to add an outlet is significant. By inserting the board in the tank gauge's card rack, cables between the tank gauge and an external device are not required. In an embodiment, the board has 6 colored LED lights 3.6, 4 of which are software configurable to provide visual indications of problems and performance. Two LEDs indicate transmit and receive communications with the gauge. The board 3.1 has a reboot button 3.7 accessible via the mounting bracket which is accessible to the user under the tank gauge and without opening the tank gauge. The board has two sets of pins 3.8 which are used to physically and electrically connect the processor board 3.5 to the interface board 3.1. The board 3.1 has a metal bracket 3.3 used to secure the board within or onto the tank gauge. The board 3.1 is perforated with perforations 3.9 so that processor LED's are visible from outside the tank gauge, the reboot button 3.7 is available and physical cable connections are available. The interface board 3.1 has an electrically isolated connector 3.4 used in connecting to other devices, and in one embodiment, employs the use of a wireless adapter. The electrical isolation applies to communications as well as power, preventing electrical surges from other devices damaging the gauge. In an embodiment a power conditioning circuit 3.10 transforms power taken from the tank gauge to power suitable for the board and processor 3.5.

The processor board 3.5 has a flexible powerful processor and includes 2 USB, 4 RS232, 1 HDMI, multiple analog inputs, multiple digital inputs, counters and digital outputs. The design of the interface board 3.1, and the bracket 3.3 ensures a secure physical and electrical connection of the processor board as well as access to connectors through the bracket. In one embodiment the processor board uses the Open Source Ubuntu Linux operating system in firmware as well as an Open Source hardware design for the processor which prevents software obsolescence via hardware unavailability. The processor board has additional amber and green LEDs built into the Ethernet connector which indicates the state of the Ethernet communications.

Figure 3B:
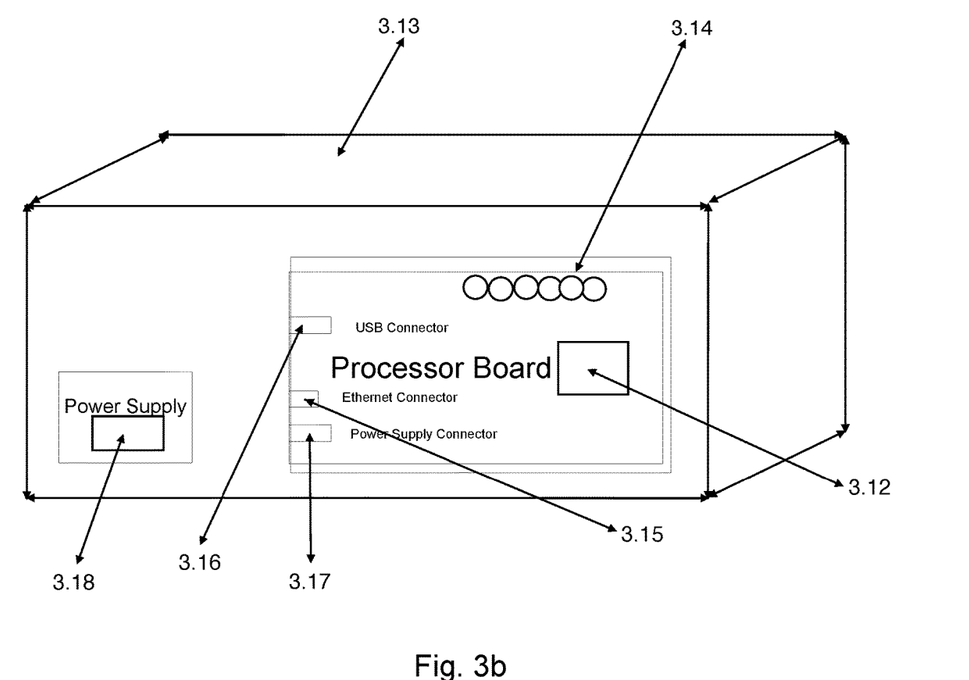
FIG. 3*b* is a schematic diagram view of the gauge adapter device, according to a further embodiment of the present invention.

Referring now to FIG. 3b, a schematic of the gauge adapter device is shown in accordance with a second embodiment of the two hardware options that host the gauge adapter device. The processor board 3.12 is similar to that described above. It is mounted in a translucent box 3.13 that shows the state of the gauge adapter device through LEDs 3.14 and also provides access to an Ethernet connector 3.15, USB connector 3.16, and 5V power supply connector 3.17. A USB to RS232 or similar cable(s) (not shown) sufficiently long so that the gauge adapter device can be located adjacent to an electrical outlet, may be provided to connect to the serial connection for tank gauges other than TLS 350 or TLS 300 gauges. In one embodiment there is a Wi-Fi module that plugs into the device to communicate with the site's Wi-Fi. A 110V AC to 5V DC power supply 3.18 is also included.

In order to install the gauge adapter device, it is fixed within or onto the tank gauge and electrically connected with the tank gauge. It then connects to the server through a router, either by wire or wirelessly. The installation is unique in that its plug and play as compared with network setup required with other solutions.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

We claim:

1. A gauge adapter device, comprising:
   a. a gauge interface circuit board comprising:
   b. a network adapter;
   c. at least one set of pins adapted to connect to a tank gauge;
   d. a power interface connected to the gauge interface circuit board adapted to connect to the tank gauge to receive power from the tank gauge; and
   e. a plurality of lights adapted to provide transmit and receive indications.

2. The gauge adapter device of claim 1 wherein the gauge adapter device is insertable into a tank gauge housing.

3. The gauge adapter device of claim 1 further comprising a bracket for mounting the gauge adapter device on a tank gauge housing.

4. The gauge adapter device of claim 3 wherein the bracket is perforated.

5. The gauge adapter device of claim 1 wherein the gauge adapter circuit board has a reset button.

6. The gauge adapter device of claim 1 further comprising a power conditioning circuit between the power interface and the gauge interface circuit board.

7. The gauge adapter device of claim 1 further comprising a translucent housing, wherein the gauge adapter circuit board is mounted within the translucent housing.

8. A gauge adapter system, comprising a gauge adapter device and a server, the gauge adapter device comprising:
   a. a gauge interface circuit board comprising a network adapter;
   b. at least one set of pins adapted to connect to a tank gauge;
   c. a power interface connected to the gauge interface circuit board adapted to connect to the tank gauge to receive power from the tank gauge; and
   d. a plurality of lights adapted to provide transmit and receive indications;
   wherein each gauge adapter device has a unique source IP address; and
   e. a server comprising:
   f. a decryption and encryption module that encrypts and decrypts messages;
   g. a plurality of gauge adapter device queues each in communication with a gauge adapter device, the queues containing commands for the gauge adapter devices; and
   h. a command generator adapted to placing commands in the gauge adapter device queues.

9. The system of claim 8 further comprising an external computer using a tank gauge emulation feature to send commands and receive responses through the system, wherein the commands are authenticated by a source IP address of the external computer.

10. The system of claim 9 further comprising an access control list of authorized IP addresses, wherein the server authenticates an external computer operating tank gauge emulation software by comparing the external computer source IP address to the access control list.

11. A method for monitoring a tank gauge, comprising the steps of:
    a. encrypting and decrypting communications between one or more gauge adapter devices and server using private keys encoded to the hardware and location of the one or more gauge adapter devices;
    b. each gauge adapter device being associated with a command queue containing command generator tasks and tank gauge emulation tasks;
    c. using command filtering to ensure only authorized commands are placed in the associated gauge adapter device's queue; and
    d. performing fuel level forecasting and business inventory reconciliation.

12. The method of claim 11, further comprising tank gauge emulation, comprising the steps of:
    a. an external computer sending a tank gauge emulation task to the gauge adapter device queue; and
    b. sending a reply from the associated gauge adapter device to the external computer, wherein the user configures the external computer with a server IP address and a port corresponding to the associated gauge adapter device.

13. The method of claim 12 wherein a source IP address is used to authenticate a connection.

14. The method of claim 12 wherein an incoming port number is used to identify a specific gauge adapter device.

* * * * *